(12) United States Patent
Baldwin

(10) Patent No.: US 9,980,607 B2
(45) Date of Patent: May 29, 2018

(54) MULTI-SECTION OVERSIZED SKILLET APPARATUS

(71) Applicant: Frank Baldwin, Charlottesville, VA (US)

(72) Inventor: Frank Baldwin, Charlottesville, VA (US)

(*) Notice: Subject to any disclaimer, the term of this patent is extended or adjusted under 35 U.S.C. 154(b) by 32 days.

(21) Appl. No.: 14/746,690

(22) Filed: Jun. 22, 2015

(65) Prior Publication Data

US 2015/0366401 A1 Dec. 24, 2015

Related U.S. Application Data

(60) Provisional application No. 62/015,403, filed on Jun. 21, 2014.

(51) Int. Cl.
*A47J 37/00* (2006.01)
*A47J 37/04* (2006.01)
*A47J 37/10* (2006.01)
*A47J 37/06* (2006.01)

(52) U.S. Cl.
CPC ................... *A47J 37/0682* (2013.01)

(58) Field of Classification Search
CPC .. A47J 37/00; A47J 37/04; A47J 37/10; A47J 2037/0795
USPC ......... 99/339, 340, 352, 353, 357, 359, 372, 99/374, 376, 377, 379, 380, 399, 448, 99/449
See application file for complete search history.

(56) References Cited

U.S. PATENT DOCUMENTS

| | | | | |
|---|---|---|---|---|
| 863,536 A | * | 8/1907 | Hudson | B65D 21/0204 220/23.4 |
| 905,318 A | * | 12/1908 | Hudson | B65D 21/0204 220/23.4 |
| 1,292,476 A | * | 1/1919 | Kavanagh | B65D 43/162 220/4.22 |
| 1,402,065 A | * | 1/1922 | Griffin | A21B 3/13 249/113 |
| 1,879,268 A | * | 9/1932 | Hurst | A21B 3/13 249/169 |
| 2,903,229 A | * | 9/1959 | Lange | A47J 45/00 126/215 |
| 3,640,029 A | * | 2/1972 | Zildjian | B24D 13/08 134/6 |

(Continued)

*Primary Examiner* — Michael Laflame, Jr.
(74) *Attorney, Agent, or Firm* — The Keys Law Firm PLLC

(57) ABSTRACT

A multi-section skillet apparatus for providing a cooking surface for a conventional range of increased size includes two mirror image skillet sections which are removably attachable to one another. Both skillet sections include four short legs which raise the bottom of the skillet sections uniformly so that the cooking surface is level when disposed over multiple stove burners while still keeping the skillet section's close enough to the burners for the burners to can heat the skillet sections. The skillet sections are selectively connected together through the inclusion of corresponding portions of a clamp fastener on thereon. When the sides of the skillet section are pressed together, the clamp fasteners engage so as to fasten the skill sections together. The multi-section skillet apparatus can be separated back into two discrete skillet sections through the application of manual force in a separating direction sufficient to disengage the clamp fasteners.

11 Claims, 2 Drawing Sheets

(56) References Cited

U.S. PATENT DOCUMENTS

| | | | | |
|---|---|---|---|---|
| 3,704,142 | A | * 11/1972 | Wilson | A47J 36/022 4/144.1 |
| 4,176,593 | A | 12/1979 | Terzian | |
| 4,873,921 | A | * 10/1989 | Piane, Sr. | A47J 37/10 220/23.4 |
| 6,065,394 | A | * 5/2000 | Gelderman | A47J 37/10 99/424 |
| 6,990,893 | B2 | 1/2006 | Cheng | |
| D613,117 | S | 4/2010 | Richburg | |
| 8,789,460 | B1 | * 7/2014 | Smith | A21B 3/132 220/23.8 |
| 2012/0024865 | A1 | * 2/2012 | Riedl | A21B 3/137 220/573.1 |
| 2012/0216686 | A1 | 8/2012 | Panea | |
| 2012/0318256 | A1 | 12/2012 | Chilton et al. | |
| 2014/0238385 | A1 | * 8/2014 | Smith | A47J 37/108 126/39 E |

\* cited by examiner

MULTI-SECTION OVERSIZED SKILLET APPARATUS

CROSS REFERENCE TO RELATED APPLICATIONS

This application claims the benefit of and incorporates by reference U.S. provisional patent application Ser. No. 62/015,403 filed Jun. 21, 2015.

BACKGROUND OF THE INVENTION

Field of the Invention

This invention relates generally to cooking structures and, more particularly, to a removably attachable, two section skillet which can be utilized as one or two single small skillets or one large skillet.

Description of the Prior Art

Whether preparing food for just a single person or a group of people, many people often desire to use a skillet having a large enough surface area to accommodate a lot of food at once. It is understood, however, that such a large skillet would be impractical or undesirable for typical routine use, would be difficult to clean, and would be difficult to store when not in use. Therefore, a problem which still exists is that existing skillets having a single fixed size do not provide size flexibility while cooking, cleaning, or in storage. There remains a need for an oversized, multi-section skillet apparatus sized to cover a plurality of burners on a stove. It would be helpful if such a multi-section skillet apparatus was operable as one or two discrete skillets, each of which covered two burners. It would be additionally desirable for such a multi-section skillet apparatus to cover all four burners of a conventional stove when assembled into a single piece.

The Applicant's invention described herein provides for a multi-section skillet apparatus adapted to fit over and utilize all four burners on a conventional stove. The primary components in Applicant's multi-section skillet apparatus a first skillet section and a second skillet section. When in operation, the multi-section skillet apparatus enables the preparation of large meals on a structure which can be selectively broken down for cleaning, storage, or for when such a large surface is not required. As a result, many of the limitations imposed by prior art structures are removed.

SUMMARY OF THE INVENTION

A multi-section skillet apparatus for providing a cooking surface for a conventional range of increased size. The multi-section skillet apparatus comprises two mirror image skillet sections which are removably attachable to one another. Both skillet sections additionally include four short legs which raise the bottom of the skillet sections uniformly so that the cooking surface is level when disposed over multiple stove burners while still keeping the skillet section's close enough to the burners for the burners to can heat the skillet sections.

The skillet sections are selectively connected together through the inclusion of corresponding portions of a clamp fastener on thereon. Accordingly, when the sides of the skillet section are pressed together, the clamp fasteners engage so as to fasten the skill sections together. The multi-section skillet apparatus can be separated back into two discrete skillet sections through the application of manual force in a separating direction sufficient to disengage the clamp fasteners.

It is an object of this invention to provide an oversized, multi-section skillet apparatus sized to cover a plurality of burners on a stove.

It is another object of this invention to provide a multi-section skillet apparatus operable as one or two discrete skillets, each of which covered two burners.

It is yet another object of this invention to provide a multi-section skillet apparatus which covers all four burners of a conventional stove when assembled into a single piece.

These and other objects will be apparent to one of skill in the art.

DETAILED DESCRIPTION OF THE INVENTION

Figure 1:
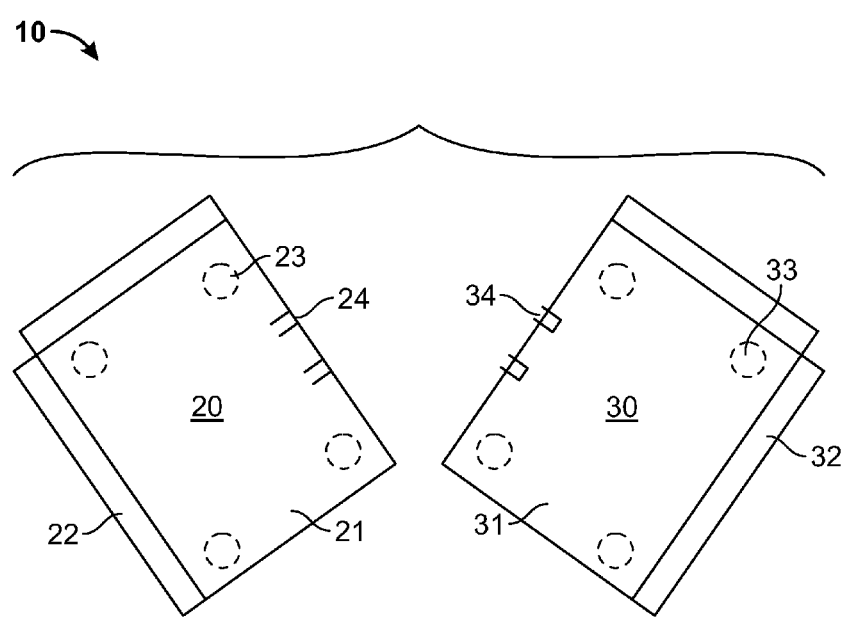
FIG. 1 is a top plan view of a multi-section skillet apparatus built in accordance with the present invention in its separated state.

Referring now to the drawings and in particular FIG. 1, a multi-section skillet apparatus 10 is shown having a first skillet section 20 and a second skillet section 30 detached from one another. The first skillet section 20 and the second skillet section 20 are mirror image skillet structures, each constructed with conventional skillet components such as a cooking surface 21, 31, and a border rim 22, 32. In this regard, both skillet sections 20, 30 are configured as conventional skillets to receive and cook food. They are each sized to cover two burners, having the dimensions of 13.75"×19.75" in the preferred embodiment.

Both skillet sections 20, 30 additionally include four short legs 23, 33 disposed close to each corner. The legs 23, 33 raise the bottom of the skillet sections slightly to enable the skillet sections 20, 30 to have solid and level support when disposed over a plurality of stove burners. In the preferred embodiment, each leg 23, 33 is 2" high, which is high enough ensure the bottom of the skillet section 20, 30 clears the burners but short enough so that heat from the burners can heat the skillet sections 20, 30.

In one embodiment, the legs 23, 33 are selectively adjustable in height and can each be screwed in or out to increase or decrease its length relative to the height of the skillet sections 20, 30. Advantageously, such adjustability enables either or both skillet sections 20, 30 to be used on a stovetop that is not level.

The first skillet section 20 and the second skillet section 30 each additionally include corresponding portions of a clamp fastener 24, 34. The clamp fastener 24 on the first skillet section 20 is configured as the receiving clamp portion and the clamp fastener 34 on the second skillet section 30 is configured as the engaging clamp portion. When the side of the first skillet section 20 is pressed against the side of the second skillet section 30, the engaging clamp portion engages the receiving clamp portion to removably attach the first skillet section 20 to the second skillet section 30.

Figure 2:
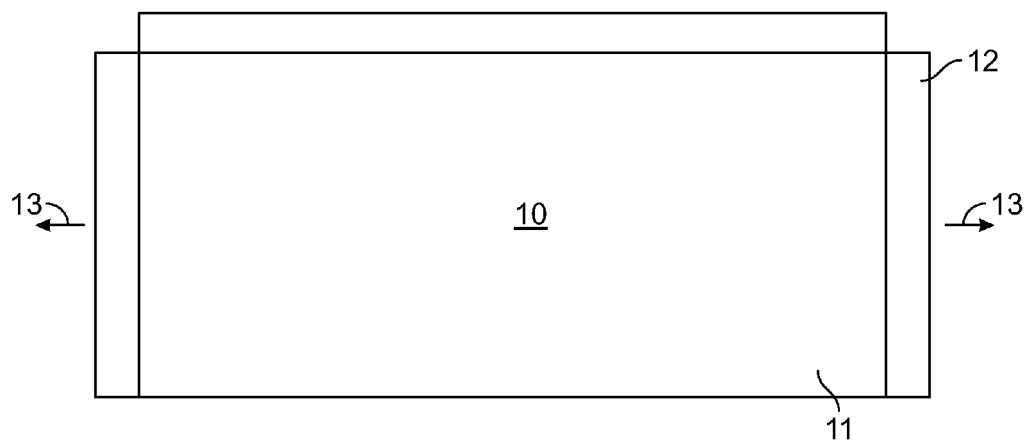
FIG. 2 is a top plan view of a multi-section skillet apparatus built in accordance with the present invention in its combined state.

Referring now to FIG. 2, the multi-section skillet apparatus 10 when assembled provides a smooth, consistent cooking surface 11, surrounded on three sides by a border rim 12. The rectangular structure is sized to cover all four burners of a conventional stove, providing maximum cooking area. The multi-section skillet apparatus 10 can be separated into two discrete skillet sections by disengaging the clamp portion from the receiving clamp portion and applying of manual force in a separating direction 13.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A multi-section skillet apparatus, comprising:
a first skillet section and a second skillet section, each defining a convex polygonal structure having a cooking surface and sized to cover a plurality of stovetop burners, wherein said first skillet section and second skillet section each additionally include a leg proximate to each corner of the respective convex polygonal skillet section and for each skillet section, each leg is attached to a bottom of the skillet section and is adapted to raise the corner to which the leg is proximate so as to enable the cooking surface of the first skillet section and the cooking surface of the second skillet section to be leveled when disposed over multiple burners; and
said first skillet section and second skillet section configured to be selectively fixed together such that the cooking surface of the first skillet section and the cooking surface of the second skillet section can form a single, continuous composite cooking surface, wherein said first skillet section and second skillet section are mirror image of one another.

2. The multi-section skillet apparatus of claim 1, wherein said first skillet section and second skillet section each additionally include at least one border rim.

3. The multi-section skillet apparatus of claim 1, wherein a number of the legs for each skillet section is four.

4. The multi-section skillet apparatus of claim 1, wherein the height of each leg is two inches.

5. The multi-section skillet apparatus of claim 1, wherein the height of each leg is adjustable.

6. The multi-section skillet apparatus of claim 1, wherein said first skillet section and second skillet section each include corresponding portions of a clamp fastener, thereby configuring said first skillet section and second skillet section to be selectively fixed together.

7. The multi-section skillet apparatus of claim 1, wherein said first skillet section and second skillet section each define a rectangular structure.

8. The multi-section skillet apparatus of claim 7, wherein each leg on said first skillet section and on said second skillet section is proximate to a corner of the respective rectangular skillet section.

9. A multi-section skillet apparatus, comprising:
a first skillet section and a second skillet section, each having a cooking surface and sized to cover a plurality of stovetop burners, wherein said first skillet section and second skillet section each define a rectangular structure; and
said first skillet section and second skillet section configured to be selectively fixed together such that the cooking surface of the first skillet section and the cooking surface of the second skillet section can form a single, continuous composite cooking surface, wherein said first skillet section and second skillet section each additionally include a leg proximate to each corner of the respective rectangular skillet section and for each skillet section, each leg is attached to a bottom of the skillet section and is adapted to selectively raise the corner to which the leg is proximate so as to enable the cooking surface of the first skillet section and the cooking surface of the second skillet section to be leveled when disposed over multiple burners.

10. The multi-section skillet apparatus of claim 9, wherein said first skillet section and second skillet section each additionally include at least one border rim.

11. The multi-section skillet apparatus of claim 9, wherein said first skillet section and second skillet section are mirror image of one another.

* * * * *